US008529642B2

(12) United States Patent  
Naito (10) Patent No.: US 8,529,642 B2  
(45) Date of Patent: Sep. 10, 2013

(54) SOLID ELECTROLYTIC CAPACITOR AND METHOD FOR PRODUCING THE SAME (75) Inventor: Kazumi Naito, Tokyo (JP)

(73) Assignee: Showa Denko K.K., Tokyo (JP)

( * ) Notice: Subject to any disclaimer, the term of this patent is extended or adjusted under 35 U.S.C. 154(b) by 148 days.

(21) Appl. No.: 13/139,668

(22) PCT Filed: Dec. 15, 2009

(86) PCT No.: PCT/JP2009/006871  
§ 371 (c)(1),  
(2), (4) Date: Jul. 20, 2011

(87) PCT Pub. No.: WO2010/070878  
PCT Pub. Date: Jun. 24, 2010

(65) Prior Publication Data  
US 2011/0267741 A1 Nov. 3, 2011

(30) Foreign Application Priority Data

Dec. 15, 2008 (JP) ................................ 2008-318738  
May 21, 2009 (JP) ................................ 2009-123614

(51) Int. Cl.  
*H01G 9/04* (2006.01)  
*H01G 9/145* (2006.01)

(52) U.S. Cl.  
USPC .......................................... 29/25.03; 361/532

(58) Field of Classification Search  
CPC ............................ H01G 9/0425; H01G 9/028  
USPC ................................ 361/525, 532; 29/25.03  
See application file for complete search history.

(56) References Cited

U.S. PATENT DOCUMENTS

| 4,780,796 A | 10/1988 | Fukuda et al. |
| 4,910,645 A | 3/1990 | Jonas et al. |
| 6,462,936 B1 * | 10/2002 | Fujimoto et al. .............. 361/525 |
| 6,580,601 B2 * | 6/2003 | Hamada et al. ................ 361/523 |
| 7,023,689 B2 * | 4/2006 | Matsumoto et al. .......... 361/523 |
| 2004/0111849 A1 | 6/2004 | Omori et al. |
| 2006/0209496 A1 | 9/2006 | Takatani et al. |

FOREIGN PATENT DOCUMENTS

| JP | 3-46215 A | 2/1991 |
| JP | 3-127813 A | 5/1991 |
| JP | 6-151261 A | 5/1994 |
| JP | 3040113 B2 | 5/2000 |
| JP | 3061331 B2 | 7/2000 |
| JP | 2002-373834 A | 12/2002 |
| JP | 2006-261360 A | 9/2006 |

* cited by examiner

*Primary Examiner* — Eric Thomas  
(74) *Attorney, Agent, or Firm* — Sughrue Mion, PLLC (57) ABSTRACT

An object of the present invention is to provide a solid electrolytic capacitor comprising an anode body composed of a sintered body, in which ESR scarcely increases even after reflow at the time of mounting when compared with that before mounting, and a method for producing the same. Disclosed is a solid electrolytic capacitor comprising an anode body composed of a sintered body, a dielectric layer formed on a surface of the anode body, a semiconductor layer formed on the dielectric layer, wherein the semiconductor layer comprises a layer of a conductive polymer containing a sulfur element and a conductor layer formed on the semiconductor layer, wherein the conductor layer comprises a layer containing silver, wherein the layer containing silver is less than 1.3 ppm by mass in the content of a sulfur element after heat history at 260° C. for 5 seconds.

7 Claims, 2 Drawing Sheets

SOLID ELECTROLYTIC CAPACITOR AND METHOD FOR PRODUCING THE SAME

CROSS REFERENCE TO RELATED APPLICATIONS

This application is a National Stage of International Application No. PCT/JP2009/006871, filed on Dec. 15, 2009, which claims priority from Japanese Patent Application Nos. 2008-318738, filed on Dec. 15, 2008 and 2009-123614, filed on May 21, 2009 the contents of all of which are incorporated herein by reference in their entirety.

TECHNICAL FIELD

The present invention relates to a solid electrolytic capacitor comprising an anode body composed of a sintered body, in which equivalent series resistance (hereinafter sometimes referred to as ESR) scarcely increases even after reflow at the time of mounting when compared with that before mounting, and a method for producing the solid electrolytic capacitor. More particularly, the present invention relates to a solid electrolytic capacitor comprising an anode body composed of a sintered body, in which ESR before mounting is as small as about several mΩ, and also ESR scarcely increases even after reflow at the time of mounting when compared with that before mounting, and a method for producing the solid electrolytic capacitor.

BACKGROUND ART

There is known a solid electrolytic capacitor comprising a layer of conductive polymer as solid electrolyte namely semiconductor layer, which is obtained by forming a dielectric oxide film in an anode body composed of a sintered body or a foil made of a valve action metal such as tantalum, niobium, aluminum, titanium or the like using an anodization method, and then forming the conductive polymer layer on the oxide film (Patent Document 1, etc.) This solid electrolytic capacitor has been used in various applications since it is possible to decrease ESR when compared with that of a solid electrolytic capacitor using manganese dioxide as solid electrolyte, which has conventionally been used.

In the preparation of a conductive polymer, a thiophene derivative, a pyrrole derivative, an aniline derivative or the like is usually used as a monomer. In order to use this conductive polymer as a solid electrolyte in a solid electrolytic capacitor, there is usually used a chemical oxidation polymerization method in which an oxidizing agent and a dopant are added to the monomer and the mixture is reacted on a dielectric oxide film to form a conductive polymer layer (Patent Document 2, etc.), or an electrolytic polymerization method in which a dopant is added to the monomer and the mixture is reacted on a dielectric oxide film by application of electricity to form a conductive polymer layer (Patent Document 3, etc.) There is also used a method in which a solution of a conductive polymer is prepared and an anode body with a dielectric oxide film formed thereon is impregnated with the solution and then the solution is converted into a coating film by drying to form a conductive polymer layer (coating method).

By the way, when electronic components such as a solid electrolytic capacitor are mounted on a circuit board, reflow soldering is carried out. Reflow soldering is a soldering method in which a solder is preliminarily supplied to the position to be connected with electronic components on a circuit board and electronic components are placed thereon, followed by heating to 200° C. or higher using a reflow furnace.

In a solid electrolytic capacitor comprising an anode body composed of a foil of aluminum or the like, ESR scarcely varies even by heating at the time of reflow soldering and thus it is comparatively easy to design an electronic equipment.

However, in a solid electrolytic capacitor comprising an anode body composed of a sintered body of tantalum or the like, ESR as important characteristics of a capacitor has sometimes increased largely when compared with that before heating by heating at the time of this reflow soldering. Also, a further increase in ESR has arisen by electrically repeated use of the capacitor after ESR once increased Since the recently used solid electrolytic capacitor exhibits a small value of ESR, such as several mΩ, even slight increase by about 1 mΩ is a problem which cannot be omitted in the design of the electronic equipment.

Patent Document 4 proposes, as a solid electrolytic capacitor in which an increase in ESR due to high temperature and high humidity is suppressed, a solid electrolytic capacitor comprising an anode body composed of a valve action metal or an alloy containing a valve action metal as a main component, a dielectric layer formed by anodizing the anode body, an electrolyte layer formed on the dielectric layer and a cathode formed on the electrolyte layer, in which the cathode comprises a silver layer formed using a silver paste, wherein the silver layer contains 0.01 to 0.5% by weight of sulfur and/or a sulfur compound. In this solid electrolytic capacitor, migration of silver contained in the silver layer is prevented by the addition of sulfur or the like and, even after standing in high temperature and high humidity at 85° C. and 85% RH, ESR may scarcely increase. However, this solid electrolytic capacitor exhibits ESR as large as over 10 mΩ. Also, an increase in ESR due to reflow heat at about 260° C. is not sufficiently suppressed.

Patent Document 5 proposes that a boron simple substance or a boron-based intermetallic compound powder is added to a silver layer thereby preventing migration of silver contained in the silver layer. However, there is a problem that, even in case the boron simple substance or boron-based intermetallic compound powder is added to the silver layer, migration of silver contained in the silver layer cannot be sufficiently prevented and short circuit still arises in the solid electrolytic capacitor under an environment of high temperature and high humidity, and thus a leakage current increases.

PRIOR ART

Patent Document

Patent Document 1: JP H3-46215 A
Patent Document 2: JP 3,040,113 B
Patent Document 3: JP H03-61331 B
Patent Document 4: JP 2006-261360 A
Patent Document 5: JP H06-151261 A

SUMMARY OF THE INVENTION

Problems to be Resolved by the Invention

An object of the present invention is to provide a solid electrolytic capacitor comprising an anode body composed of a sintered body, in which ESR scarcely increases even after reflow at the time of mounting when compared with that before mounting, and a method for producing the solid electrolytic capacitor. Particularly, an object of the present invention is to provide a solid electrolytic capacitor comprising an anode body composed of a sintered body, in which ESR before mounting is as small as about several mΩ, and also ESR scarcely increases even after reflow at the time of mounting when compared with that before mounting, and a method for producing the solid electrolytic capacitor.

Means for Solving the Problems

The present inventor has studied in detail a semiconductor layer composed of a conductive polymer and a conductor layer containing silver so as to achieve the aforementioned object.

First, the conductive polymer used in the semiconductor layer of the solid electrolytic capacitor usually has a structure in which a polymer having a conjugated double bond is doped with a dopant. A sulfonic acid compound or the like may be sometimes used as the dopant, and a polymer having a polythiophene skeleton may be sometimes used as the polymer having a conjugated double bond. The solid electrolytic capacitor usually passes through a preheated portion at about 170° C. and a maximum temperature portion at about 260° C. in reflow at the time of mounting (namely, the solid electrolytic capacitor is exposed to an atmosphere at 200° C. or higher for several minutes). In contrast, since the layer containing silver is formed using a conventional silver paste containing no sulfur element, no sulfur element should be contained in the layer containing silver.

However, a solid electrolytic capacitor, which comprises a semiconductor layer composed of a conductive polymer containing such a sulfur element and an anode body composed of a sintered body made of a tantalum powder or the like, and also exhibits a large increase in ESR after mounting reflow, was examined and, as a result, it has been found that the layer containing silver contained the sulfur element which should not be contained. That is, the present inventor has found such a phenomenon that ESR increases after mounting reflow when the sulfur element is contained in the layer containing silver.

Therefore, the present inventor has made an adjustment so that the content of a sulfur element after heat history at 260° C. for 5 seconds is less than 1.3 ppm by mass in the layer containing silver. As a result, they have found that, in the obtained solid electrolytic capacitor, ESR scarcely increases after reflow at the time of mounting when compared with that before mounting even in case ESR before mounting is as small as about several mΩ.

The present invention has been completed by further studying in more detail based on these findings.

The present invention includes the followings.
<1> A solid electrolytic capacitor comprising:
an anode body composed of a sintered body,
a dielectric layer formed in a surface of the anode body,
a semiconductor layer formed on the dielectric layer, wherein the semiconductor layer comprises a layer of a conductive polymer containing a sulfur element and
a conductor layer formed on the semiconductor layer, wherein the conductor layer comprises a layer containing silver, wherein the layer containing silver is less than 1.3 ppm by mass in the content of a sulfur element after heat history at 260° C. for 5 seconds.

<2> The solid electrolytic capacitor according to <1>, wherein the conductive polymer comprises a polymer having a conjugated double bond.
<3> The solid electrolytic capacitor according to <2>, wherein the polymer having the conjugated double bond is a polymer having a polythiophene skeleton.
<4> The solid electrolytic capacitor according to <1>, wherein the conductive polymer is a polymer which has a conjugated double bond and is doped with a dopant.
<5> The solid electrolytic capacitor according to <4>, wherein the dopant is a sulfonic acid compound.
<6> The solid electrolytic capacitor according to any one of <1> to <5>, wherein the layer containing silver is formed using a silver paste.
<7> The solid electrolytic capacitor according to any one of <1> to <6>, wherein the conductor layer further comprises a layer containing a conductive carbon.
<8> The solid electrolytic capacitor according to any one of <1> to <7>, wherein the anode body is a sintered body of a tantalum powder or a niobium powder.
<9> A method for producing a solid electrolytic capacitor, in which the method comprises the steps of:
forming a dielectric layer in a surface of an anode body composed of a sintered body,
forming a semiconductor layer composed of a conductive polymer containing a sulfur element on the dielectric layer,
forming a conductor layer comprising a layer containing silver on the semiconductor layer,
electrically connecting the anode body to an anode terminal and the conductor layer to a cathode terminal, respectively,
sealing the thus obtained product except a portion of the anode terminal and the cathode terminal, and
adjusting the content of a sulfur element in the layer containing silver of the thus produced solid electrolytic capacitor after heat history at 260° C. for 5 seconds to less than 1.3 ppm by mass, after the step of forming a layer containing silver and before the step of sealing.
<10> The method for producing a solid electrolytic capacitor according to <9>, wherein the step of adjusting the content of a sulfur element comprises standing in an environment under reduced pressure at a temperature of 180° C. or higher.
<11> The method for producing a solid electrolytic capacitor according to <9>, wherein the step of adjusting the content of a sulfur element comprises standing in an environment under reduced pressure of 6 Pa to 3,000 Pa (absolute pressure) at a temperature of 190° C. to 220° C.
<12> The method for producing a solid electrolytic capacitor according to <9>, wherein the step of adjusting the content of a sulfur element comprises standing in an environment under reduced pressure of 100 Pa to 1,500 Pa (absolute pressure) at a temperature of 190° C. to 220° C.
<13> The method for producing a solid electrolytic capacitor according to any one of <10> to <12>, wherein the step of adjusting the content of a sulfur element includes standing in the above environment within 24 hours.
<14> The method for producing a solid electrolytic capacitor according to any one of <10> to <12>, wherein the step of adjusting the content of a sulfur element includes standing in the above environment for 30 minutes to 10 hours.

<15> The method for producing a solid electrolytic capacitor according to any one of <9> to <14>, wherein the step of forming a semiconductor layer comprises polymerizing of a thiophene derivative in the presence of a dopant.

<16> The method for producing a solid electrolytic capacitor according to any one of claims <9> to <15>, which further comprises, after the step of forming a layer containing silver and before the step of sealing, the step of standing under an inert gas atmosphere at −100° C. to −40° C.

<17> The method for producing a solid electrolytic capacitor according to <16>, wherein the time of the standing under an inert gas atmosphere at −100° C. to −40° C. is from 1 hour to 100 hours.

Advantageous Effect of the Invention

According to the solid electrolytic capacitor of the present invention, ESR scarcely increases even after reflow at the time of mounting when compared with that before mounting. Particularly, according to the solid electrolytic capacitor of the present invention, even in case ESR before mounting is as small as about several mΩ, ESR scarcely increases even after reflow at the time of mounting when compared with that before mounting.

According to the method for producing a solid electrolytic capacitor of the present invention, it is possible to easily obtain a solid electrolytic capacitor comprising an anode body composed of a sintered body, in which ESR scarcely increases even after reflow at the time of mounting when compared with that before mounting, particularly a solid electrolytic capacitor comprising an anode body composed of a sintered body, in which ESR before mounting is as small as about several mΩ, and also ESR scarcely increases even after reflow at the time of mounting when compared with that before mounting.

EMBODIMENT FOR CARRYING OUT THE INVENTION

The solid electrolytic capacitor according to an embodiment of the present invention will be specifically described below by reference to the accompanying drawings. The solid electrolytic capacitor of the present invention is not limited to the following embodiments and appropriate modifications can be made without departing from the scope of the present invention.

Figure 1:
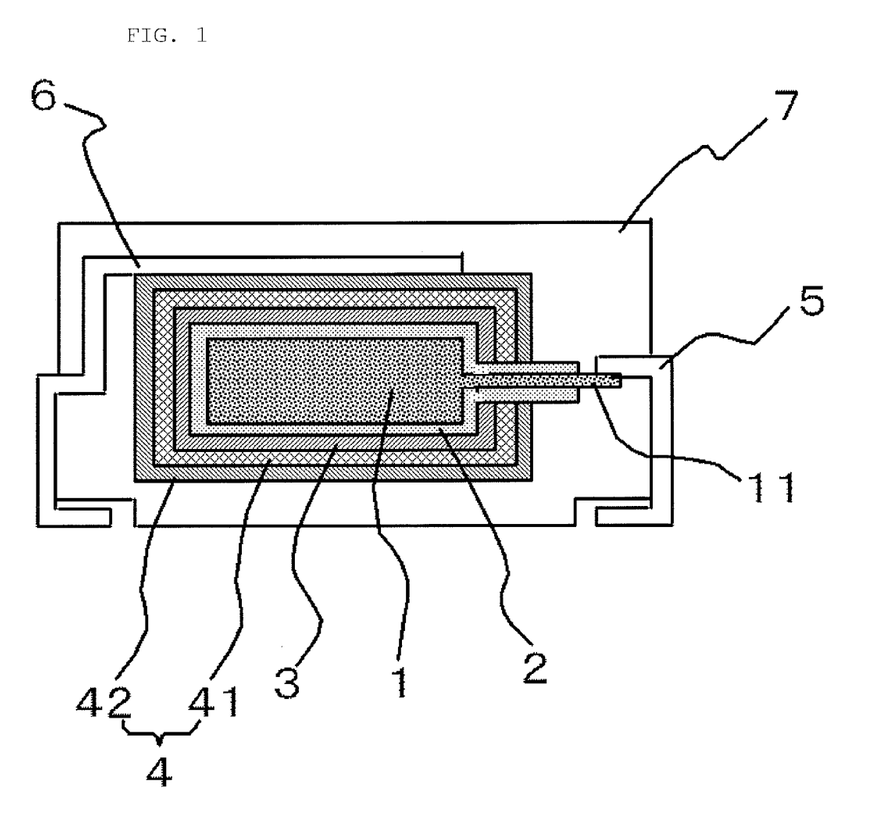
[FIG. 1] a cross-sectional explanatory view of a solid electrolytic capacitor according to an embodiment of the present invention.

In a solid electrolytic capacitor in this embodiment, as shown in FIG. 1, an anode body 1 composed of a valve action metal such as tantalum, aluminum, niobium or titanium, or an alloy containing such a valve action metal as a main component is used. A lead wire 11 is pulled out from the anode body 1. The anode boy used in the present invention is a sintered body and is preferably a porous body obtained by sintering a powder of the valve action metal or the like.

The anode body 1 is subjected to anodization (chemical conversion treatment) in an electrolytic solution to form a dielectric layer 2 composed of an oxide in a surface of the anode body 1. In the chemical conversion treatment, it is possible to use an electrolytic formation method which is usually used.

Also, a semiconductor layer 3 is formed so as to cover a surface of the dielectric layer 2.

Figure 2:
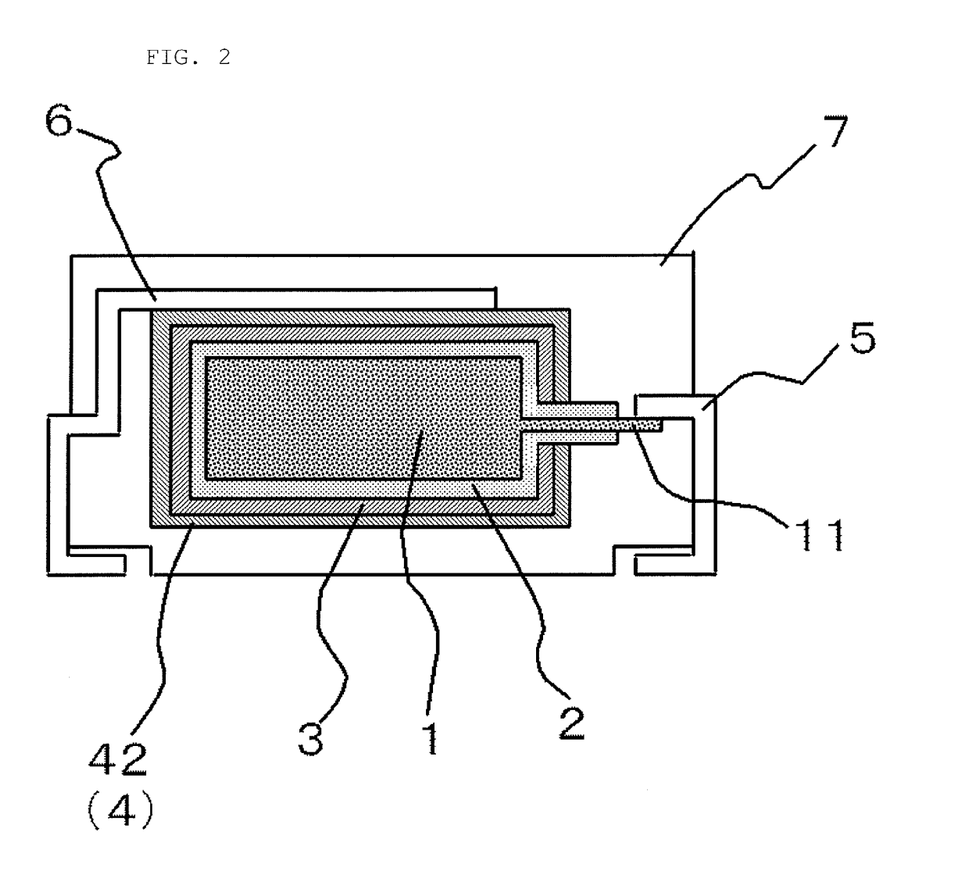
[FIG. 2] a cross-sectional explanatory view of a solid electrolytic capacitor according to another embodiment, in which a cathode is not provided with a carbon layer.

In FIG. 1 and FIG. 2, it is drawn as if the dielectric layer 2 and the semiconductor layer 3 are formed only on an outer surface of the anode body 1. However, in case the anode body is a porous body, the dielectric layer and the semiconductor layer are also formed on a surface of pores inside the porous body.

The semiconductor layer 3 comprises a conductive polymer layer containing a sulfur element. A sulfur element may be contained in a skeleton of the polymer, and also may be contained in a dopant with which the polymer is doped.

Examples of the conductive polymer include polythiophene-based derivative, polyphenylenevinylene-based derivative, polypyrrole-based derivative, polyaniline-based derivative, polyacetylene-based derivative, polyphenylene-based derivative, polyisothianaphthene derivative and the like. The derivative has a structure in which a side chain is attached to a polymer having a basic skeleton such as polythiophene skeleton. Examples of the side chain include alkyl group (the number of carbon atoms in an alkyl group is not particularly limited, but is preferably from 1 to 12) such as methyl group, butyl group, hexyl group, octyl group or dodecyl group; alkoxy group (the number of carbon atoms in an alkoxy group is not particularly limited, but is preferably from 1 to 12) such as methoxy group, ethoxy group, ethylenedioxy group or dodecyloxy group; halogen group, hydroxyl group, acetyl group, carboxyl group, ether group, ester group, phenyl group, sulfonic acid group and the like. The side chain may be bonded to the basic skeleton at plural positions to form a cyclic structure.

In the present invention, the conductive polymer preferably contains a polymer having a conjugated double bond, and particularly preferably a polymer having a polythiophene skeleton. The conductive polymer can be used alone or in combination of two or more.

The conductive polymer is usually doped with a dopant. The dopant can be selected from dopants used usually in a conductive polymer for a solid electrolytic capacitor.

The dopant is preferably a sulfonic acid compound from the viewpoint capable of obtaining a solid electrolytic capacitor having satisfactory characteristics.

Examples of the sulfonic acid include benzoquinone sulfonic acid, anthracene sulfonic acid, anthraquinone sulfonic acid, 1,5-naphthalene disulfonic acid, 1,6-naphthalene disulfonic acid, 1-octane sulfonic acid, 1-naphthalene sulfonic acid, 2-naphthalene sulfonic acid, 2,6-naphthalene disulfonic acid, 2,7-naphthalene disulfonic acid, 2-methyl-5-isopropylbenzene sulfonic acid, 4-octylbenzene sulfonic acid, 4-nitrotoluene-2-sulfonic acid, m-nitrobenzene sulfonic acid, n-octyl sulfonic acid, n-butane sulfonic acid, n-hexane sulfonic acid, o-nitrobenzene sulfonic acid, p-ethylbenzene sulfonic acid, p-chlorobenzene sulfonic acid, p-decylbenzene sulfonic acid, p-dodecylbenzene sulfonic acid, p-toluene sulfonic acid, p-nitrobenzene sulfonic acid, p-pentylbenzene sulfonic acid, ethane sulfonic acid, camphorsulfonic acid, dinonylnaphthalene sulfonic acid, acetyl sulfonic acid, dodecyl sulfonic acid, trichlorobenzene sulfonic acid, trifluoromethane sulfonic acid, hydroxybenzene sulfonic acid, butylnaphthalene sulfonic acid, benzene sulfonic acid, polyvinyl sulfonic acid, methane sulfonic acid and the like.

Examples of the salt of the sulfonic acid include lithium salt, potassium salt, sodium salt, copper salt, iron salt, aluminium salt, cerium salt, tungsten salt, chrome salt, manganese salt, tin salt, methyl ammonium salt, dimethyl ammonium salt, trimethyl ammonium salt, tetramethyl ammonium salt, ethyl ammonium salt, diethyl ammonium salt, triethyl ammonium salt, tetraethyl ammonium salt, ethylmethyl ammonium salt, diethylmethyl ammonium salt, dimethylethyl ammonium salt, triethylmethyl ammonium salt, trimethylethyl ammonium salt, diethyldimethyl ammonium salt, propyl ammonium salt, dipropyl ammonium salt, isopropyl ammonium salt, diisopropyl ammonium salt, butyl ammonium salt, dibutyl ammonium salt, methylpropyl ammonium salt, ethylpropyl ammonium salt, methylisopropyl ammonium salt, ethylisopropyl ammonium salt, methylbutyl ammonium salt, ethylbutyl ammonium salt, tetra-methylol ammonium salt, tetra-n-butyl ammonium salt, tetra-sec-butyl ammonium salt, tetra-t-butyl ammonium salt, piperidinium salt, pyrrolidium salt, morpholinium salt, piperadinium salt, pyridinium salt, α-picolinium salt, β-picolinium salt, γ-picolinium salt, quinolinium salt, isoquinolinium salt, pyrrolinium salt, ammonium salt and the like.

In the conductive polymer, impurities contained in the monomer used to produce the conductive polymer may be contained. For example, in the thiophene compound as the monomer, thiirane, thietane, thiolane, thiane, dithiolane, dithiane and the like may be sometimes contained as impurities. Also, carbon disulfide used in the case of synthesizing thiophene from furan or methylfuran, sulfur used in the case of synthesizing thiophene from butadiene, butane or butene, diphosphorus pentasulfide or diphosphorus trisulfide used in the case of synthesizing thiophene from sodium succinate and the like may be sometimes contained. The unreacted monomer may sometimes remain in the conductive polymer. It is not necessarily the case that the dopant, the unreacted monomer and impurities in the monomer remain as they are even after reflow, and may be sometimes converted into derivatives thereof by pyrolysis or the like.

It is possible to use any one of an electrolytic polymerization method, a chemical oxidation polymerization method, a method comprising coating dispersion liquid of a conductive polymer or a method using in combination of these methods so as to form a conductive polymer layer. Specific examples thereof include a method in which an anode body with a dielectric layer formed thereon is impregnated with a solution prepared by mixing a monomer, a dopant and, if necessary, an oxidizing agent, or a solution prepared by mixing a monomer with a dopant having an oxidizing action, and then the solution is polymerized; a method in which an anode body with a dielectric layer formed thereon is impregnated with a monomer solution and subsequently impregnated with a solution containing a dopant and an oxidizing agent, and then the solution is polymerized; a method in which an anode body with a dielectric layer formed thereon is impregnated with a solution containing a dopant and an oxidizing agent and subsequently impregnated with a monomer solution, and then the solution is polymerized; and the like.

Restorative formation (reformation) may be carried out during or after formation of a semiconductor layer. In the restorative formation, it is possible to use an electrolytic formation method which is usually used.

Next, a conductor layer is formed so as to cover a surface of the semiconductor layer 3. In FIG. 1, a carbon layer 41 is formed on the semiconductor layer 3 using a conductive carbon paste and also a layer containing silver 42 is formed on the carbon layer 41 using a silver paste.

As shown in FIG. 2, it is also possible to provide only a layer containing silver 42 so as to cover a surface of the semiconductor layer 3 without providing the carbon layer 41.

According to the solid electrolytic capacitor of the present invention, the content of a sulfur element in the layer containing silver is less than 1.3 ppm by mass, and preferably less than 0.8 ppm by mass, after heat history at 260° C. for 5 seconds. When the content of a sulfur element is 1.3 ppm by mass or more, an increase in ESR due to reflow heat is remarkable. The content of a sulfur element in the layer containing silver is determined as follows: a layer containing silver is taken out from a solid electrolytic capacitor after heat history at 260° C. for 5 seconds and the layer containing silver is combusted, and then the amount of sulfur dioxide generated is measured and the content of a sulfur element is determined by conversion from the amount of sulfur dioxide.

The step of adjusting the content of a sulfur element in the layer containing silver after heat history at 260° C. for 5 seconds is usually carried out after the step of forming a layer containing silver and before the step of sealing.

Although there is no particular limitation on the method of adjusting the content of a sulfur element in the layer containing silver, a method comprising standing in an environment under reduced pressure at a temperature of 180° C. or higher is preferable. It is feared that a water washing method or the like takes long time to adjust the content of a sulfur element. It is also feared that a chemical treatment method using mineral acid or the like exerts an adverse influence on other components.

More suitable method of adjusting the content of a sulfur element is a method comprising standing in an environment under reduced pressure of 6 Pa to 3,000 Pa (absolute pressure) at a temperature of 190° C. to 220° C. Particularly suitable method of adjusting the content of a sulfur element is a method comprising standing in an environment under reduced pressure of 100 Pa to 1,500 Pa (absolute pressure) at a temperature of 190° C. to 220° C. The standing time is preferably within 24 hours, and particularly preferably from 30 minutes to 10 hours. When the standing time is too long or the temperature is too high, deterioration of a capacitor starts. Also, excessive pressure reduction may exert an adverse action on the attachment portion between a dielectric layer and a semiconductor layer, and thus LC (leakage current) of a capacitor may increase. In contrast, when pressure reduction is too insufficient, it is difficult to adjust the content of a sulfur element even over a long time.

In the present invention, it is preferred to further comprise, after the step of forming a layer containing silver and before the step of sealing, the step of standing under an inert gas atmosphere at −100° C. to −40° C. Examples of the inert gas include nitrogen, argon, helium and the like. The standing time is not particularly limited, but is preferably from 1 hour to 100 hours. The content of a sulfur element in the layer containing silver after heat history at 260° C. for 5 seconds is suppressed to a low value by this standing at low temperature. The factor of this suppression effect is not clear, but is estimated that a semiconductor layer is stabilized by standing at low temperature and thus migration of a sulfur element to a silver layer is suppressed.

In the solid electrolytic capacitor of this embodiment, an anode terminal 5 is connected to a lead wire 11 pulled out from the anode body 1 and also a cathode terminal 6 is connected to a silver layer 42 in the cathode portion 4, and sealing is carried out using an outer packaging body 7 composed of an insulting resin such as an epoxy resin while the anode terminal 5 and the cathode terminal 6 are taken out to the outside. A conventional lead frame can be used in order to attach the cathode terminal and the anode terminal. The solid electrolytic capacitor thus obtained can be optionally subjected to an aging treatment. The solid electrolytic capacitor of the present invention can be used by mounting on various electric circuits or electronic circuits.

EXAMPLES

The solid electrolytic capacitor of the present invention will be more specifically described below by way of Examples. The present invention is not limited to the following Examples and appropriate modifications can be made without departing from the scope of the present invention.

Example 1

A sintered body (measuring 3 mm in width, 1 mm in height and 4.5 mm in length, a tantalum lead wire of 0.40 mmφ in diameter was pulled out in a lengthwise direction) made from a tantalum powder having a CV value of 150,000 μF·V/g was subjected to chemical conversion in a phosphoric acid aqueous solution to form a dielectric oxide film in a surface of the sintered body.

Next, the sintered body was impregnated with ethylenedioxythiophene as a monomer and anthraquinone sulfonic acid as a dopant, and then subjected to electrolytic polymerization to form a semiconductor layer (cathode) composed of a polythiophene derivative doped with anthraquinone sulfonic acid on the dielectric oxide film.

A conductive carbon paste and a silver paste were sequentially laminated on the semiconductor layer to form a conductor layer, thus obtaining a solid electrolytic capacitor element.

The tantalum lead wire and the face measuring 3 mm×4.5 mm of the capacitor element were respectively placed on both protrusions of a separately prepared lead frame (measuring 3.4 mm in width and 8 mm in length, including opposite protrusions with a gap of 1 mm, 0.1 mm in thickness, base material is made of copper alloy, ground is made of nickel plating, and surface layer is made of tin plating). The tantalum lead wire was connected electrically and mechanically to the lead frame by resistance welding and the face measuring 3 mm×4.5 mm was connected electrically and mechanically to the lead frame by drying and curing of the silver paste, respectively. The silver paste used above originally contains no sulfur element.

The capacitor element was let stand in an atmosphere under reduced pressure of 10 Pa (absolute pressure) at a temperature of 190° C. for 1 hour. The content of a sulfur element in a silver-containing layer was adjusted by this operation.

After returning to normal temperature and normal pressure, the capacitor element was let stand under a nitrogen atmosphere at −55° C. for 24 hours.

Subsequently, the capacitor element connected to the lead frame was disposed on a predetermined position in a mold and then subjected to sealing by transfer molding using an epoxy resin and curing the resin. After sealing, the lead frame was cut into a predetermined dimension, followed by bending to form an external terminal, thereby obtaining a chip-shaped solid electrolytic capacitor measuring 7.3 mm×4.3 mm×1.8 mm and having a capacity of 1,000 μF and a rated voltage of 2.5 V.

(Measurement of Content of Sulfur Element in Silver-Containing Layer)

The chip-shaped solid electrolytic capacitor thus produced was passed once through a reflow furnace set at 170° C. for 2 minutes, at 230° C. or higher for 45 seconds and at 260° C. (maximum temperature) for 5 seconds. After reflow, seal of the chip-shaped solid electrolytic capacitor was broken and a conductor layer was taken out and combusted, and then the amount of sulfur dioxide generated was measured. The content of a sulfur element in a silver-containing layer was calculated from the amount of sulfur dioxide. The results are shown in Table 1.

(Measurement of ESR and LC of Solid Electrolytic Capacitor)

ESR (measured at 100 kHz) and LC (measured at 2.5 V for 60 seconds) of the chip-shaped solid electrolytic capacitor thus produced were measured. Then, the chip-shaped solid electrolytic capacitor was passed through a reflow furnace set at a maximum temperature of 260° C. After reflow, ESR (measured at 100 kHz) of the chip-shaped solid electrolytic capacitor was measured. The results are shown in Table 2.

Examples 2 to 5, Comparative Examples 1 to 4

Chip-shaped solid electrolytic capacitors were obtained in the same manner as in Example 1, except that pressure reduction and heat treatment (normal pressure and heat treatment in Comparative Example 4) for the adjustment of the content of a sulfur element were carried out under the conditions shown in Table 1. And characteristic values of the chip-shaped solid electrolytic capacitors were determined in the same manner as in Example 1. The results are shown in Table 1 and Table 2.

Example 6

A chip-shaped solid electrolytic capacitor was obtained in the same manner as in Example 2, except that a capacitor element was not left to stand under a nitrogen atmosphere of −55° C. for 24 hours. And characteristic values of the chip-shaped solid electrolytic capacitor were determined in the same manner as in Example 1. The results are shown in Table 1 and Table 2.

Comparative Example 5

A chip-shaped solid electrolytic capacitor was obtained in the same manner as in Example 1, except that pressure reduction and heat treatment for the adjustment of the content of a sulfur element, and standing under a nitrogen atmosphere at −55° C. for 24 hours were not carried out. And characteristic values of the chip-shaped solid electrolytic capacitor were determined in the same manner as in Example 1. The results are shown in Table 1 and Table 2.

Comparative Example 6

In the same manner as in Example 6, except that immersion in sulfuric acid having a concentration of 1% for 20 minutes was carried out in place of pressure reduction and heat treatment for the adjustment of the content of a sulfur element, an attempt was made to obtain a chip-shaped solid electrolytic capacitor. However, a structure of the capacitor was damaged as a result of swelling of a conductor layer.

Comparative Example 7

In the same manner as in Example 6, except that immersion in ethanol for 2 hours was carried out in place of pressure reduction and heat treatment for the adjustment of the content of a sulfur element, a chip-shaped solid electrolytic capacitor was obtained and characteristic values thereof were determined in the same manner as in Example 1. The results are shown in Table 1 and Table 2.

Reference Example

A plurality of strip-shaped foils each measuring 8 mm in length and 3 mm in width were cut out from an aluminum foil 100LV20B manufactured by JAPAN CAPACITOR INDUSTRIAL CO., LTD. An insulator layer having a width of 0.7 mm composed of an imide resin was provided in a headband like shape at the portion, which is 4 mm apart from a tip of the foil, around both surfaces of the foil, whereby the foil was divided into a portion measuring 4 mm×3 mm and a portion measuring 3.3 mm×3 mm. An aluminum wire having a diameter of 0.3 mmϕ was welded at a tip side (2 mm) of the portion measuring 4 mm×3 mm. It was possible to apply an electric current to the aluminum foil through this aluminum wire (terminal). A plurality of these aluminum foils equipped with a terminal were produced.

The aluminum foils equipped with a terminal were immersed in an aqueous 10% by mass ammonium adipate solution, except for the terminal portion, and then subjected to electrolytic formation at 4 V and 85° C. to form a dielectric layer in a surface of the foils.

Only the portion measuring 3.3 mm×3 mm was immersed in a 20% by mass ethylenedioxythiophene alcohol solution (monomer solution) and, after pulling up, air-dried at room temperature. Only the portion measuring 3.3 mm×3 mm was immersed in an aqueous solution (oxidizing agent solution) containing 20% by mass ammonium persulfate and 3% by mass anthraquinone sulfonic acid dissolved therein. After pulling up, a polymerization reaction was carried out at 105° C. for 1 hour. This cycle of immersion in a monomer, immersion in an oxidizing agent and a polymerization reaction was repeated several times. Thereby, a semiconductor layer composed of a polythiophene derivative was formed on the dielectric layer.

A conductive carbon paste and a silver paste were sequentially laminated on the semiconductor layer to form a conductor layer. A tip portion measuring 2.5 mm×3 mm welded with the aluminum wire was removed by cutting to obtain a capacitor element.

A cathode portion of the capacitor element was disposed on a cathode portion of a separately prepared lead frame so that an insulator layer portion composed of an imide resin enters into a gap between protrusions of the lead frame (measuring 3.4 mm in width and 8 mm in length, including opposite protrusions with a gap of 1 mm, 0.1 mm in thickness, base material is made of copper alloy, ground is made of nickel plating, surface layer is made of tin plating), and then the cathode portion (portion measuring 3.3 mm×3 mm) of the capacitor element was connected to the lead frame using a silver paste. Another capacitor element was laid on the capacitor element thus connected to the lead frame in the same configuration and then cathode portions of capacitor elements were connected with each other using a silver paste. In such way, seven capacitor elements were laid one upon another. The silver paste was cured by heating at 125° C. for 10 minutes.

An anode portion (2 mm×3 mm portion) of the capacitor elements laid one upon another was connected to an anode portion of the lead frame by resistance welding.

The capacitor elements connected to the lead frame were placed on a predetermined position in a mold and then subjected to sealing by transfer molding using an epoxy resin and curing the resin. After sealing, the lead frame was cut into a predetermined dimension, followed by bending to form an external terminal, thereby obtaining an aluminum solid electrolytic capacitor measuring 7.3 mm×4.3 mm×1.8 mm and having a rated voltage of 2.0 V and a capacity of 330 μF. Characteristic values thereof were determined in the same manner as in Example 1. The results are shown in Table 1 and Table 2.

Example 7

A niobium primary powder (having an average particle diameter of 0.31 μm) was obtained from a niobium ingot using a crushing method with hydrogen embrittlement. The niobium primary powder was granulated to obtain a niobium powder having an average particle diameter of 128 μm (this niobium powder is a fine powder and is therefore naturally oxidized in atmospheric air, and 90,000 ppm of oxygen exists). The niobium powder was left to stand in a nitrogen atmosphere at 450° C. and then left to stand in an argon atmosphere at 700° C. to obtain a partially nitrided niobium powder with the nitridation amount of 8,500 ppm (having CV value of 270,000 μF·V/g). This partially nitrided niobium powder was molded together with a niobium lead wire having a diameter of 0.29 mmϕ and then calcined at 1,270° C. to obtain a plurality of sintered bodies (anode bodies) each measuring 3.1 mm×4.5 mm×1.0 mm and having the mass of 44±2 mg. 1.3 mm of the niobium lead wire was embedded in the sintered body and 10 mm of the niobium lead wire was pulled out from the sintered body.

In the same manner as in Example 1, a dielectric layer, a semiconductor layer, a carbon paste layer and a silver paste layer were sequentially formed to obtain a capacitor element, which was connected to a lead frame in the same manner as in Example 1.

Then, the capacitor element was allowed to stand in an atmosphere under reduced pressure of 10 Pa (absolute pressure) at a temperature of 190° C. for 1 hour. The content of a sulfur element in silver-containing layer was adjusted by this operation.

After returning to normal temperature and normal pressure, the capacitor element was left to stand under a nitrogen atmosphere at −55° C. for 24 hours.

Subsequently, the capacitor element connected to the lead frame was disposed on a predetermined position in a mold and then subjected to sealing by transfer molding using an epoxy resin and curing the resin. After sealing, the lead frame was cut into a predetermined dimension, followed by bending to form an external terminal, thereby obtaining a niobium solid electrolytic capacitor measuring 7.3 mm×4.3 mm×1.8 mm and having a rated voltage of 2.5 V and a capacity of 470 μF. Characteristic values thereof were determined in the same manner as in Example 1. The results are shown in Table 1 and Table 2.

Comparative Example 8

A niobium solid electrolytic capacitor was obtained in the same manner as in Example 7, except that pressure reduction and heat treatment for the adjustment of the content of a sulfur element, and standing under a nitrogen atmosphere at −55° C. for 24 hours were not carried out, and characteristic values thereof were determined in the same manner as in Example 1. The results are shown in Table 1 and Table 2.

TABLE 1

| | Adjustment Method of Sulfur element Content | Absolute pressure [kPa] | Temp. [° C.] | Time [hrs] | Completed With or Not Completed With Standing at a low temp. of −55° C. | Sulfur element Content in silver-containing layer [ppm by mass] |
|---|---|---|---|---|---|---|
| Ex. 1 | Heating under reduced pressure | 0.01 | 190 | 1 | C/W | 0.39 |
| Ex. 2 | Heating under reduced pressure | 0.1 | 200 | 5 | C/W | 0.00 |
| Ex. 3 | Heating under reduced pressure | 1 | 180 | 7 | C/W | 0.52 |
| Ex. 4 | Heating under reduced pressure | 1 | 200 | 10 | C/W | 0.00 |
| Ex. 5 | Heating under reduced pressure | 3 | 220 | 24 | C/W | 0.78 |
| Ex. 6 | Heating under reduced pressure | 0.1 | 200 | 5 | NCW | 1.25 |
| Comp. Ex. 1 | Heating under reduced pressure | 4 | 230 | 5 | C/W | 2.46 |
| Comp. Ex. 2 | Heating under reduced pressure | 1 | 170 | 3 | C/W | 4.01 |
| Comp. Ex. 3 | Heating under reduced pressure | 1 | 200 | 0.2 | C/W | 2.20 |
| Comp. Ex. 4 | Heating under normal pressure | Normal pressure | 200 | 5 | C/W | 4.92 |
| Comp. Ex. 5 | — | — | — | — | NCW | 5.56 |
| Comp. Ex. 6 | Immersion in 1% sulfuric acid for 20 min. | — | — | — | NCW | — |
| Comp. Ex. 7 | Immersion in ethanol for 2 hr | — | — | — | NCW | 4.53 |
| Ex. 7 | Heating under reduced pressure | 0.01 | 190 | 1 | C/W | 0.41 |
| Comp. Ex. 8 | — | — | — | — | NCW | 5.32 |
| Ref. Ex. | — | — | — | — | NCW | 3.87 |

The measurement was not carried out because of swelling of conductor layer in Comparative Example 6. Neither heat treatment under reduced pressure nor standing at low temperature was carried out in Comparative Examples 5 and 8.

TABLE 2

| | Anode body | Before reflow ESR [mΩ] | Before reflow LC [μA] | After reflow ESR [mΩ] | After reflow Amount of change in ESR [mΩ] |
|---|---|---|---|---|---|
| Ex. 1 | Ta sintered body | 5.0 | 20 | 5.1 | 0.1 |
| Ex. 2 | Ta sintered body | 5.0 | 12 | 5.0 | 0.0 |
| Ex. 3 | Ta sintered body | 4.9 | 19 | 5.0 | 0.1 |
| Ex. 4 | Ta sintered body | 4.9 | 16 | 4.9 | 0.0 |
| Ex. 5 | Ta sintered body | 5.1 | 20 | 5.2 | 0.1 |
| Ex. 6 | Ta sintered body | 5.1 | 21 | 5.5 | 0.4 |
| Comp. Ex. 1 | Ta sintered body | 7.3 | 22 | 9.2 | 1.9 |
| Comp. Ex. 2 | Ta sintered body | 5.2 | 24 | 6.7 | 1.5 |
| Comp. Ex. 3 | Ta sintered body | 5.4 | 25 | 6.8 | 1.4 |
| Comp. Ex. 4 | Ta sintered body | 5.2 | 27 | 6.4 | 1.2 |
| Comp. Ex. 5 | Ta sintered body | 5.1 | 26 | 7.0 | 1.9 |
| Comp. Ex. 6 | Ta sintered body | — | — | — | — |
| Comp. Ex. 7 | Ta sintered body | 5.2 | 27 | 6.5 | 1.3 |
| Ex. 7 | Nb sintered body | 7.9 | 36 | 8.0 | 0.1 |
| Comp. Ex. 8 | Nb sintered body | 7.9 | 38 | 10.2 | 2.3 |
| Ref. Ex. | Al foil | 2.0 | 1.1 | 2.3 | 0.3 |

The measurement was not carried out because of swelling of conductor layer in Comparative Example 6. Each value in the table is an average (n=50)

As shown in Table 1 and Table 2, when a conductive polymer containing a sulfur element is comprised in a semiconductor layer, the layer (silver-containing layer) obtained by using a silver paste, which originally contained no sulfur element, contains a sulfur element after reflow (see Comparative Examples 5 and 8).

It is also apparent that, regarding those in which a conductive polymer layer containing a sulfur element is comprised in a semiconductor layer, and also an adjustment is made so that the content of a sulfur element in a silver-containing layer after heat history at 260° C. for 5 seconds is less than 1.3 ppm by mass, an increase in ESR due to reflow heat scarcely arises (see Examples 1 to 7).

It is also apparent that, when subjected to standing at low temperature after the pressure reduction and heat treatment, the content of a sulfur element in a silver-containing layer after heat history at 260° C. for 5 seconds is suppressed to a low value and high effect of suppressing an increase in ESR is exerted (comparison between Example 2 and Example 6).

It is apparent that, regarding those in which the content of a sulfur element in a silver-containing layer after heat history at 260° C. for 5 seconds is 1.3 ppm by mass or more, ESR increases by at least several mΩ due to reflow heat (see Comparative Examples 1 to 5 and 7 to 8).

In an aluminum solid electrolytic capacitor comprising an anode body composed of a foil, even when the content of a sulfur element is high, ESR after reflow scarcely increases (Reference Example). Namely, it is apparent that a solid electrolytic capacitor comprising an anode body composed of a foil has not substantially such a problem that ESR increases even after reflow at the time of mounting when compared with that before mounting.

As is apparent from the above, it is possible to suppress the amount of change in ESR to the degree, which is the same as or more than that in case of a solid electrolytic capacitor comprising an anode body composed of a foil, even in case of a solid electrolytic capacitor comprising an anode body composed of a sintered body by applying the present invention.

REFERENCE SIGNS LIST

| | |
|---|---|
| 1: | Anode body |
| 2: | Dielectric layer |
| 3: | Semiconductor layer |
| 4: | Cathode portion |
| 5: | Anode terminal |
| 6: | Cathode terminal |
| 7: | Resin layer (Outer packaging body) |
| 11: | Lead wire |
| 41: | Carbon layer |
| 42: | Silver layer |

The invention claimed is:

1. A method for producing a solid electrolytic capacitor in which the method comprises the steps of:
    forming a dielectric layer in a surface of an anode body composed of a sintered body,
    forming a semiconductor layer composed of a conductive polymer containing a sulfur element on the dielectric layer,
    forming a conductor layer comprising a layer containing silver on the semiconductor layer,
    electrically connecting the anode body to an anode terminal and the conductor layer to a cathode terminal, respectively,
    sealing the thus obtained product except a portion of the anode terminal and the cathode terminal, and
    adjusting the content of a sulfur element in the layer containing silver of the thus produced solid electrolytic capacitor after heat history at 260° C. for 5 seconds to less than 1.3 ppm by mass, after the step of forming a layer containing silver and before the step of sealing,
    wherein the step of adjusting the content of a sulfur element comprises standing in an environment under reduced pressure of 6 Pa to 3,000 Pa (absolute pressure) at a temperature of 190° C. to 220° C.

2. The method for producing a solid electrolytic capacitor according to claim 1, wherein the step of adjusting the content of a sulfur element comprises standing in an environment under reduced pressure of 100 Pa to 1,500 Pa (absolute pressure) at a temperature of 190° C. to 220° C.

3. The method for producing a solid electrolytic capacitor according to claim 1, wherein the step of adjusting the content of a sulfur element includes the standing in the environment within 24 hours.

4. The method for producing a solid electrolytic capacitor according to claim 1, wherein the step of adjusting the content of a sulfur element includes the standing in the environment for 30 minutes to 10 hours.

5. The method for producing a solid electrolytic capacitor according to claim 1, wherein the step of forming a semiconductor layer comprises polymerizing of a thiophene derivative in the presence of a dopant.

6. A method for producing a solid electrolytic capacitor in which the method comprises the steps of:
    forming a dielectric layer in a surface of an anode body composed of a sintered body,
    forming a semiconductor layer composed of a conductive polymer containing a sulfur element on the dielectric layer,
    forming a conductor layer comprising a layer containing silver on the semiconductor layer,
    electrically connecting the anode body to an anode terminal and the conductor layer to a cathode terminal, respectively,
    sealing the thus obtained product except a portion of the anode terminal and the cathode terminal, and
    adjusting the content of a sulfur element in the layer containing silver of the thus produced solid electrolytic capacitor after heat history at 260° C. for 5 seconds to less than 1.3 ppm by mass, after the step of forming a layer containing silver and before the step of scaling,
    wherein the method further comprises, after the step of forming a layer containing silver and before the step of sealing, the step of standing under an inert gas atmosphere at −100° C. to −40° C.

7. The method for producing a solid electrolytic capacitor according to claim 6, wherein the time of the standing under an inert gas atmosphere at −100° C. to −40° C. is from 1 hour to 100 hours.

* * * * *